United States Patent Office 2,716,115
Patented Aug. 23, 1955

2,716,115

PROCESS OF PRODUCING CAPROLACTAM

Bruno Blaser, Dusseldorf-Urdenbach, and Günther Tischbirek, Dusseldorf-Benrath, Germany, assignors to Henkel & Cie., G. m. b. H., Dusseldorf-Holthausen, Germany, a limited liability company of Germany No Drawing. Application July 23, 1952,
Serial No. 300,494

Claims priority, application Germany July 27, 1951

10 Claims. (Cl. 260—239.3)

This invention relates to an improved process of producing caprolactam, and more particularly to a process of preparing caprolactam from cyclohexanone oxime.

It is known to rearrange cyclohexanone oxime to caprolactam by treating said oxime with concentrated or with fuming sulfuric acid of low sulfur trioxide content at an elevated temperature. However, the products obtained in this manner have an objectionable color, contain impurities, and, therefore, must be carefully purified before further use.

In applicants' co-pending patent application Serial No. 240,441, filed August 4, 1951, an improved process of carrying out said rearrangement is disclosed and claimed, said process comprising reacting cyclohexanone oxime with sulfur trioxide in liquid sulfur dioxide or carbon disulfide solution to cause rearrangement.

Cyclohexanone oxime and sulfur trioxide, in the absence of any diluting solvent, react very vigorously with each other, thereby rendering it almost impossible to properly control speed of rearrangement and to avoid decomposition of cyclohexanone oxime and caprolactam. The use of liquid sulfur dioxide as a diluting agent according to applicants' co-pending application Serial No. 240,441, however, has the disadvantage that this agent is gaseous at room temperature and, therefore, difficult to handle. Carbon disulfide, on the other hand, is a highly inflammable solvent and, therefore, objectionable.

The present invention has for its object to replace said liquid sulfur dioxide by a diluting agent which is not gaseous but liquid and is not inflammable and which, therefore, can be handled much more easily.

Another object of this invention consists in providing, in the place of liquid sulfur dioxide, a diluting agent which serves as solvent for the resulting caprolactam and, thus, permits its recovery from the rearrangement mixture in a simple and effective manner.

Other objects of this invention will become apparent from the specification and the examples given therein.

According to this invention, an organic solvent, tetrachloro ethylene of the formula $Cl_2C=CCl_2$, has been found particularly suitable to replace liquid sulfur dioxide in the rearrangement reaction of cyclohexanone oxime to caprolactam. Tetrachloroethylene makes it possible to carry out the reaction of cyclohexanone oxime and sulfur trioxide even on a large scale.

Concentrated solutions of 40% and more of the reactants in tetrachloro ethylene react rather vigorously. It is, however, possible to carry out the reaction of such concentrated solutions in suitable apparatus. In more dilute solutions, the reaction becomes more moderate and, therefore, can be handled more easily; at the same time, however, with increasing dilution, certain drawbacks become more and more evident, namely a decrease in throughput per unit of space and an increase in the amount of tetrachloro ethylene which has to be worked up. Therefore, optimum proportions of solvent to reactant must be chosen for any given case in accordance with the prevailing conditions and the apparatus available. Concentrations of between 5 and 30% by weight, preferably 10 and 25% by weight of each reaction component in tetrachloro ethylene have proven to be especially suitable.

The reaction may be carried out in various ways. Solutions of the reactants in tetrachloro ethylene, for instance, are directly mixed with each other. Such a procedure is, for instance, applicable when carrying out the process in continuous operation. For this purpose either small portions of solutions of the reactants are mixed with each other in a suitable apparatus or they are introduced into a reaction mixture wherein rearrangement has already taken place. When working discontinuously, i. e. in batches, the one of the two solutions is placed into the reaction vessel and the other solution is then gradually added thereto.

Great care must be taken to completely eliminate the heat o freaction generated by said rearrangement so that the reaction may be properly carried out and controlled. With smaller charges and when working more slowly, especially in laboratory experiments, it is possible to eliminate said heat of reaction in a satisfactory manner by external cooling, for instance, by jacket cooling. On large scale operation or when a greater throughput is desired, especially when working on a technical scale, it is advisable to provide for more effective cooling. This may be done, for instance, by internal cooling, or, if desired, by combined internal and external cooling, by pumping the reaction mixture through a separate cooling system, or by other means.

The addition product of sulfur trioxide and caprolactam is insoluble in tetrachloro ethylene while caprolactam itself is soluble therein. This fact is made use of for isolating caprolactam from the reaction mixture by neutralizing the same, for instance, with aqueous alkaline solutions, especially with ammonia, separating the tetrachloro ethylene layer from the aqueous layer, and distilling off the solvent. Thereby a comparatively pure crude caprolactam is obtained which can be very easily purified according to processes known per se and which is then well adapted for the production of synthetic fibers.

The following examples serve to illustrate the invention without, however, limiting the same thereto.

*Example 1*

A solution of 23 g. of cyclohexanone oxime in 150 cc. of tetrachloro ethylene is slowly added to a solution of 20 g. of sulfur trioxide in 150 cc. of tetrachloro ethylene. When working without cooling, the temperature increases considerably depending upon the speed of addition of the cyclohexanone oxime solution. It is easily possible to keep the temperature at 20° C. by slowly adding said solution, by vigorously stirring the reaction mixture, and by external cooling. As soon as the reaction is complete, the caprolactam produced thereby separates from the tetrachloro ethylene in form of an upper oily layer, consisting of an addition product of caprolactam and sulfur trioxide. The solvent layer is removed from the bottom of the reaction vessel and the addition product neutralized, while cooling, by means of concentrated aqueous ammonia. On heating to about 60° C., an almost saturated ammonium sulfate solution separates from the water containing caprolactam layer. The latter is withdrawn and is subjected to vacuum distillation. Thereby caprolactam of a melting point of 68° C. is obtained in technical grade purity and in practically quantitative yield.

*Example 2*

A solution of 20 g. of sulfur trioxide in 150 cc. of tetrachloro ethylene is cooled by means of a brine solution to —25° C. A solution of 23 g. of cyclohexanone oxime in 150 cc. of tetrachloro ethylene is added thereto, while continuously and vigorously stirring, whereby the speed of addition is regulated in such a manner that the reaction temperature does not exceed −10° C. Rearrangement at this temperature proceeds also immediately. After addition of the cyclohexanone oxime solution, the reaction mixture is worked up in the same manner as described in Example 1. Purity and yield of the caprolactam obtained in this manner are the same as when proceeding according to Example 1.

*Example 3*

The reaction mixture obtained according to Example 1 or 2, containing the insoluble oily addition product of sulfur trioxide and caprolactam is mixed, while stirring vigorously and maintaining the temperature of the mixture below about 60° C., with concentrated aqueous ammonia until the mixture is of neutral reaction. Stirring is then discontinued and the neutralized mixture is allowed to separate into two layers, an aqueous one consisting of an almost saturated ammonium sulfate solution, and the tetrachloro ethylene layer containing the caprolactam formed on rearrangement. The two layers are separated from each other, the tetrachloro ethylene is distilled off from the tetrachloro ethylene layer by heating in a vacuum, and the remaining crude caprolactam is subjected to fractional vacuum distillation whereby the same pure technical grade caprolactam is obtained as described in Example 1.

When the working up of the reaction mix is performed at temperatures low enough that the addition product of caprolactam and sulfur trioxide forms a solid, e. g. at temperatures of about −20° C., the solvent may be removed by filtering, centrifugating or in any other suitable manner.

In the place of ammonia, there may be used other alkaline agents, such as sodium and potassium hydroxides or carbonates and others more in order to neutralize the sulfur trioxide, although ammonia has proven to be the most suitable agent for the purpose. The salts, being formed by the neutralization, should be very easily soluble in water to form concentrated solutions. In this case, the solubility of the caprolactam in water is decreased.

Of course, many changes and variations in the reaction conditions, rearrangement temperature, concentration of the solutions to be reacted, methods of working up the reaction mixture and of isolating and purifying the caprolactam and the like may be made by those skilled in the art in accordance with the principles set forth herein and in the claims annexed hereto.

We claim:

1. In a process of producing caprolactam by rearranging cyclohexanone oxime, the step comprising reacting cyclohexanone oxime with sulfur trioxide in the presence of tetrachloro ethylene.

2. In a process of producing caprolactam according to claim 1, wherein the concentration of sulfur trioxide in tetrachloro ethylene and the concentration of cyclohexanone oxime in tetrachloro ethylene is between about 5% and about 30% by weight.

3. In a process of producing caprolactam by rearranging cyclohexanone oxime, the steps comprising dissolving cyclohexanone oxime in tetrachloro ethylene, gradually adding thereto a solution of sulfur trioxide in tetrachloro ethylene at a temperature not exceeding about 20° C., separating the resulting insoluble caprolactam-sulfur trioxide addition product from the tetrachloro ethylene solution, mixing said addition product with a concentrated aqueous alkaline solution to neutralize the sulfur trioxide and to isolate the caprolactam, and separating said caprolactam from said neutralized aqueous sulfur trioxide solution.

4. In a process of producing caprolactam according to claim 3, wherein a temperature not exceeding about −10° C. is maintained in the rearrangement mixture.

5. In a process of producing caprolactam according to claim 3, wherein the aqueous alkaline solution for neutralizing sulfur trioxide, is a concentrated aqueous ammonia solution.

6. In a process of producing caprolactam by rearranging cyclohexanone oxime, the step comprising adding, while stirring, a solution of cyclohexanone oxime in tetrachloro ethylene to a solution of sulfur trioxide in tetrachloro ethylene at a temperature not exceeding about 20° C.

7. In a process of producing caprolactam by rearranging cyclohexanone oxime, the steps comprising continuously mixing, while stirring, equivalent small amounts of solutions of cyclohexanone oxime in tetrachloro ethylene and of sulfur trioxide in tetrachloro ethylene and continuously removing the reacted mixture to separate the resulting caprolactam.

8. In a process of producing caprolactam by rearranging cyclohexanone oxime, the steps comprising continuously adding equivalent small amounts of solutions of cyclohexanone oxime in tetrachloro ethylene and of sulfur trioxide in tetrachloro ethylene to a substantially larger amount of a mixture of said reaction components and continuously withdrawing from said reaction mixture equivalent small amounts thereof to separate the resulting caprolactam.

9. In a process of producing caprolactam by rearranging cyclohexanone oxime, the steps comprising dissolving cyclohexanone oxime in tetrachloro ethylene, gradually adding thereto a solution of sulfur trioxide in tetrachloro ethylene at a temperature not exceeding about 20° C., adding to the resulting reaction mixture a concentrated aqueous alkaline solution to neutralize the sulfur trioxide, separating the tetrachloro ethylene layer from the aqueous layer, and distilling off tetrachloro ethylene from said tetrachloro ethylene layer to isolate the resulting caprolactam.

10. In a process of producing caprolactam according to claim 9, wherein the aqueous alkaline solution for neutralizing sulfur trioxide, is a concentrated aqueous ammonia solution.

References Cited in the file of this patent

UNITED STATES PATENTS

| 2,249,177 | Schlack | July 15, 1941 |
| 2,351,381 | Wiest | June 13, 1944 |

FOREIGN PATENTS

| 894,102 | France | Mar. 6, 1944 |

OTHER REFERENCES

MacArdle: "Solvents in Syn. Org. Chem.," p. 3 (Van Nostrand, 1925).